(12) United States Patent
Price et al.

(10) Patent No.: US 6,915,741 B2
(45) Date of Patent: Jul. 12, 2005

(54) METHOD OF PRINTING INCLUDING MOUNTING PLATE ON CYLINDER USING FOAM CUSHION TAPE

(75) Inventors: Bruce E. Price, Woodstock, CT (US); Brett W. Kilhenny, Mansfield Center, CT (US)

(73) Assignee: World Properties, Inc., Lincolnwood, IL (US)

( * ) Notice: Subject to any disclaimer, the term of this patent is extended or adjusted under 35 U.S.C. 154(b) by 175 days.

(21) Appl. No.: 10/318,209

(22) Filed: Dec. 12, 2002

(65) Prior Publication Data

US 2003/0124337 A1 Jul. 3, 2003

Related U.S. Application Data

(62) Division of application No. 09/916,116, filed on Jul. 26, 2001.
(60) Provisional application No. 60/220,906, filed on Jul. 26, 2000.

(51) Int. Cl.[7] .............................................. B41F 13/10
(52) U.S. Cl. ...................... 101/376; 101/379; 101/395; 101/401.1
(58) Field of Search ................................ 101/375, 376, 101/378, 379, 382.1, 395, 401.1; 428/304.4, 909, 317.3, 315.7, 319.3, 343, 40.1, 41.8

(56) References Cited

U.S. PATENT DOCUMENTS

| | | |
|---|---|---|
| 2,591,884 A | 4/1952 | Simon et al. |
| 2,602,783 A | 7/1952 | Simon et al. |
| 2,621,166 A | 12/1952 | Schmidt et al. |
| 2,698,838 A | 1/1955 | Simon et al. |
| 2,729,618 A | 1/1956 | Miller et al. |
| 2,779,689 A | 1/1957 | Reis, Jr. |
| 2,808,391 A | 10/1957 | Pattison |
| 2,811,493 A | 10/1957 | Simon et al. |
| 2,833,730 A | 5/1958 | Barthel, Jr. |
| 2,834,748 A | 5/1958 | Bailey et al. |

(Continued)

FOREIGN PATENT DOCUMENTS

GB        733624        7/1955

OTHER PUBLICATIONS

John Wiley & Sons, INc., Encyclopedia of Polymer Science & Engineering, Poly (phenylene Ether) to Radical Polymerization, "Polyurethanes", 1988, vol. 13 pp. 243–303.
John Wiley & Sons, Inc., Encyclopedia of Polymer Science & Engineering, Peroxy Compounds to Polyesters, "Polyamides", 1988, vol. 11 pp. 315–381.

(Continued)

*Primary Examiner*—Leslie J. Evanisko
(74) *Attorney, Agent, or Firm*—Cantor Colburn LLP

(57) ABSTRACT

A foam cushion tape comprising a compressible polyurethane foam layer having a first side and an opposite second side; a composite reinforcing film comprising an anchoring layer and a reinforcing layer, wherein the second aide of the polyurethane foam is disposed on the anchoring layer of the reinforcing film; a first adhesive disposed on the first side of the compressible polyurethane foam; and a second adhesive disposed an the reinforcing layer of the composite reinforcing film. The anchoring layer comprises at least one non-olefinio polymer, such as polyvinylidene chloride (PVDC), polyurethane, nylon, or the like. A method for the manufacture of thin, foam cushion tapes for flexographic printing is provided, comprising casting a curable polyurethane foam composition directly onto the anchoring layer of a composite reinforcing film having a first anchoring layer and a second reinforcing layer, followed by curing the foam composition to form a compressible polyurethane foam.

15 Claims, 2 Drawing Sheets

U.S. PATENT DOCUMENTS

| | | | |
|---|---|---|---|
| 2,846,458 A | 8/1958 | Haluska | |
| 2,850,476 A | 9/1958 | Seeger et al. | |
| 2,866,762 A | 12/1958 | Brochhagen et al. | |
| 2,866,774 A | 12/1958 | Price | |
| 2,868,824 A | 1/1959 | Pattison | |
| 2,870,097 A | 1/1959 | Pattison | |
| 2,877,212 A | 3/1959 | Seligman | |
| 2,878,601 A | 3/1959 | Burmeister et al. | |
| 2,902,473 A | 9/1959 | Smith | |
| 2,911,390 A | 11/1959 | Smith | |
| 2,917,480 A | 12/1959 | Bailey et al. | |
| 2,921,915 A | 1/1960 | Brochhagen et al. | |
| 2,962,524 A | 11/1960 | Hostettler et al. | |
| 3,021,309 A | 2/1962 | Cox et al. | |
| 3,021,317 A | 2/1962 | Cox et al. | |
| 3,057,901 A | 10/1962 | Plueddemann | |
| 3,169,945 A | 2/1965 | Hostettler et al. | |
| 3,383,351 A | 5/1968 | Stamberger | |
| 3,839,078 A | 10/1974 | Birchall et al. | |
| 3,931,450 A | 1/1976 | Patton, Jr. et al. | |
| 4,095,008 A | 6/1978 | Sundstrom et al. | |
| 4,360,562 A | 11/1982 | Endo et al. | |
| 4,515,739 A | 5/1985 | Maine | |
| 4,574,697 A | 3/1986 | Feeley | |
| 4,616,044 A | 10/1986 | Fesman | |
| 5,037,700 A | 8/1991 | Davis | |
| 5,325,776 A | 7/1994 | Rather, Sr. et al. | |
| 5,476,712 A | 12/1995 | Hartman et al. | |
| 5,658,630 A | 8/1997 | Shizukuda et al. | |
| 5,726,001 A | 3/1998 | Eichorst | |
| 5,733,945 A | 3/1998 | Simpson | |
| 5,894,799 A | 4/1999 | Bart et al. | |
| 5,922,781 A | 7/1999 | St. Clair et al. | |
| 5,973,016 A | 10/1999 | St. Clair et al. | |
| 2003/0012945 A1 * | 1/2003 | Runge et al. | 428/317.1 |
| 2004/0194652 A1 * | 10/2004 | Kawaguchi et al. | 101/375 |

OTHER PUBLICATIONS

John Wiley & Sons, Inc., Encyclopedia of Polymer Science & Engineering, Transitions and Relaxations to Zwitterionic Polymerization, "Vinylidene Chloride Polymers", 1989, vol. 17 pp. 492–531.

John Wiley & Sons, Inc., Encyclopedia of Polymer Science & Engineering, Polyesters to Polypeptide Synthesis, "Polyesters Film", 1988, vol. 12 pp. 193–215.

R/bak sales literature from Rogers Corporation 1995.

R/bak Series 2000 sales literature from Rogers Corporation 2000.

R/bak Series 2000A sales literature from Rogers Corporation 1998.

R/bak Series 2000R sales literature from Rogers Corporation 1998.

R/bak sales literature from Rogers Corporation 1990.

* cited by examiner

METHOD OF PRINTING INCLUDING MOUNTING PLATE ON CYLINDER USING FOAM CUSHION TAPE

CROSS-REFERENCE TO RELATED APPLICATION

This application is a division of U.S. application Ser. No. 09/916,116 filed Jul. 26, 2001 which claims the benefit of U.S. Provisional Application No. 60/220,906, filed Jul. 26, 2000.

TECHNICAL FIELD

This invention relates to foam tapes and methods of manufacture thereof. In particular, this invention relates to double-sided foam cushion tapes used in flexographic printing.

BRIEF DESCRIPTION OF THE RELATED ART

Flexible foam tapes are commonly used in flexographic printing. These tapes, commonly referred to as foam cushion tapes or foam sticky back tapes, are described, for example, in U.S. Pat. Nos. 4,574,697; 5,325,776; and 5,476,712, and comprise a flexible, compressible foam layer adhered to one side of a reinforcing film, with an adhesive disposed on the opposite side of the film. An adhesive layer is furthermore disposed on the outside of the foam layer. Such tapes may be used to secure printing plates onto a press. The compressible foam layer improves print quality while allowing higher press speeds. The tapes are typically made in 15, 20, 30, 40, 50, and 60 mil (0.38, 0.51, 0.76, 1.02, 1.27, and 1.52 millimeter) versions and are available in different compressibility levels for different types of printing.

Foam cushion tapes have typically been manufactured by casting a foam layer (polyethylene, ethylvinyl acetate, polyvinyl chloride, or polyurethane) greater than the target thickness onto a release sheet. The foam is then stripped from the release sheet and buffed to the desired thickness. The buffed foam is subsequently laminated to one side of a one-mil polyethylene terephthalate (PET) film using an adhesive. The other side of the PET film comprises a second adhesive layer disposed between the PET film and a release layer. This method of manufacture is very costly for the production of thin tapes, for example tapes 15 and 20 mil thick, and particularly for polyurethane foams. Furthermore, after use, the PET may delaminate from the foam during removal of the printing plate from the used tape, due to weak cohesive strength at the surface of the PET film.

There accordingly remains a need in the art for economical methods for the production of thin foam cushion tapes with high quality polyurethane foam.

SUMMARY OF THE INVENTION

The above-described and other drawbacks and disadvantages of the prior art are alleviated by an improved foam cushion tape comprising a compressible polyurethane foam layer having a first side and an opposite second side; a composite reinforcing film comprising an anchoring layer and a reinforcing layer, wherein the second side of the polyurethane foam is disposed on the anchoring layer of the reinforcing film; a first adhesive disposed on the first side of the compressible polyurethane foam; and a second adhesive disposed on the reinforcing layer of the composite reinforcing film. The anchoring layer comprises at least one non-olefinic polymer, such as polyvinylidene chloride (PVDC), polyurethane, nylon, or the like.

An economical method for the manufacture of thin, foam cushion tapes for flexographic printing is further provided, comprising casting a curable polyurethane foam composition directly onto the anchoring layer of a composite reinforcing film having a first anchoring layer and a second reinforcing layer, followed by curing the foam composition to form a compressible polyurethane foam.

Advantageously, this method eliminates the need for a buffing or sanding step after casting, and furthermore eliminates the need for an adhesive between the reinforcing film and the foam layer of the cushion tape. The method also produces a tape that reduces or eliminates delamination of the foam from the reinforcing film during removal of the printing plate from the cylinder after use. The result is a more streamlined and economical manufacturing process. The product tape exhibits improved performance during removal after use compared to known manufacturing methods. It also allows the production of thinner tapes, for example a 15 mil 0.38 millimeter) tape, which the current process cannot produce.

The above discussed and other features and advantages of the present invention will be appreciated and understood by those skilled in the art from the following detailed description and drawings.

DETAILED DESCRIPTION OF THE PREFERRED EMBODIMENTS

An improved foam cushion tape and method of manufacture uses a composite reinforcing film having an anchoring layer and a reinforcing layer. The anchoring layer comprises at least one non-olefinic polymer capable of forming a bond with a cured polyurethane, such as polyvinylidene chloride (PVDC), polyurethane, nylon, copolyesters, or the like, and results in a tape that does not readily delaminate during removal from the printing plate from the cylinder after printing. Use of the composite reinforcing film furthermore allows an economical method for the manufacture of thin foam cushion tapes for flexographic printing tapes, wherein the foam is directly cast onto the composite reinforcing film and cured. Advantageously, this method eliminates the need for a buffing or sanding step after casting, and also improves adhesion of the foam to the film.

Figure 1:
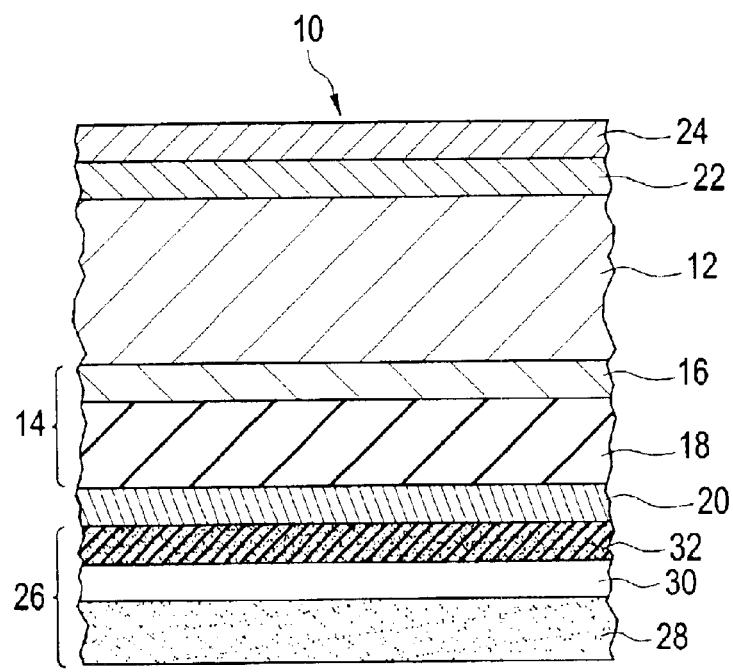
FIG. 1 is cross-sectional view of the improved foam cushion tape.

As shown in FIG. 1, in one embodiment the improved foam cushion tape 10 comprises a layer 12 of compressible, open-celled polyurethane foam disposed on a composite reinforcing film 14. The thickness of polyurethane foam layer 12 will typically be about 5 to about 60 mils (about 125 to about 1500 microns), and preferably about 12 to about 17 mils (about 300 to about 425 microns). The foam can be of variable compressibility as is known in the art.

Reinforcing film 14 comprises an anchoring layer 16 and a reinforcing layer 18. The anchoring layer 16 comprises at least one non-olefinic polymer such as polyvinylidene chloride (PVDC), polyurethane, nylon (also known as polyamide), copolyesters, or the like. Polyurethane films are described, for example, in "Encyclopedia of Polymer Science & Engineering", Volume 13, pages 243–303 and available from, for example, JPS Elastomerics. Nylon films are described in, for example, "Encyclopedia of Polymer Science & Engineering", Volume 11, pages 315–381 and are available from, for example, Poly Ply Group Corp., Miami, Fla. An anchoring layer comprising a copolyester or PVDC is preferred. Polyethylene terephthalate films having a copolyester anchoring layer are commercially available, various examples being set forth in Table 1 herein. PVDC is also well known, being described in, for example, "Encyclopedia of Polymer Science & Engineering", Volume 17, pages 492–531 and supplied by, for example, Dow Chemical Co., Midland, Mich. The thickness of the anchoring layer will typically be in the range of about 1 to about 12 microns.

Preferably, the reinforcing layer is a strong plastic that does not deform under conditions of manufacture or use, for example PET, polybutylene terephthalate, vinyl, polycarbonate, or polyetherimide. Polyethylene terephthalate is preferred. Polyethylene terephthalates for the formation of films are well known, being described in "Encyclopedia of Polymer Science & Engineering", Volume 12, pages 193–215 and supplied by, for example, E.I. DuPont de Nemours Co., Wilmington, Del. The thickness of the reinforcing layer will typically be about 0.5 to about 2 mils (about 12.5 to about 50 micrometers).

Composite films 14 are readily obtained by known methods, for example by coating one layer with the other. A preferred method is co-extrusion of the reinforcing layer 18 with the anchoring layer 16, for example co-extruding a PET film with a PVDC layer. A suitable co-extruded reinforcing film 14 comprising PET and a copolyester is available from E.I. DuPont de Nemours Co., Wilmington, Del., under the trade designation Melinex 301 H, and from Rockwell Solutions Ltd., Dundee Scotland, U. K., under the trade designation WS-30. Such films are often referred to as "heat sealing" films, allowing for sealing of the film by the application of heat, e.g., above about 220° F.

A first adhesive 24 is further disposed on the outer side of foam layer 12, preferably in combination with a primer layer 22. The first adhesive 24 is preferably a pressure-sensitive adhesive (PSA). Suitable pressure sensitive adhesives include the acrylic adhesives having removable performance from steel, aluminum, and composite cylinders.

The primer layer 22 improves the anchorage of the first adhesive layer 24 to the foam layer 12, and comprises a PSA with high tack and peel strength to both first adhesive layer 24 and the foam layer 12. Suitable pressure sensitive adhesives for use in the primer layer 22 include, for example, acrylic pressure sensitive adhesives, such as the acrylic PSA sold as Gelva 1159 by Solutia, Inc., St. Louis, Mo. Preferably, the primer layer 22 has a thickness of about 0.5 mils (12.5 micrometers).

The tape 10 furthermore comprises a second adhesive layer 20 adhered to the reinforcing layer 18. The second adhesive layer 20 preferably comprises a pressure sensitive adhesive having removable performance to the printing plates 36 (shown in FIG. 3). Suitable adhesives are known and include, for example, the acrylic adhesives available from Ashland under the trade name Aroset 1450. Acid-etching of the reinforcing layer 18 further improves anchoring of the second adhesive layer 20 to the reinforcing layer 18.

For ease of manufacture and use, the second adhesive layer 20 is typically in contact with a release layer 26. Suitable release layers are known in the art, and generally comprise a liner 28, an intermediate coating 30, and a release coating 32. Suitable liner materials include but are not limited to Kraft Paper. Suitable intermediate coatings include but are not limited to high-density polyethylene (HDPE). Suitable release coatings include but are not limited to silicone release coatings. An exemplary release layer is commercially available from Rexam Release, Bedford Park, Ill. under the trade name Rexam Grade 16043.

Figure 2:
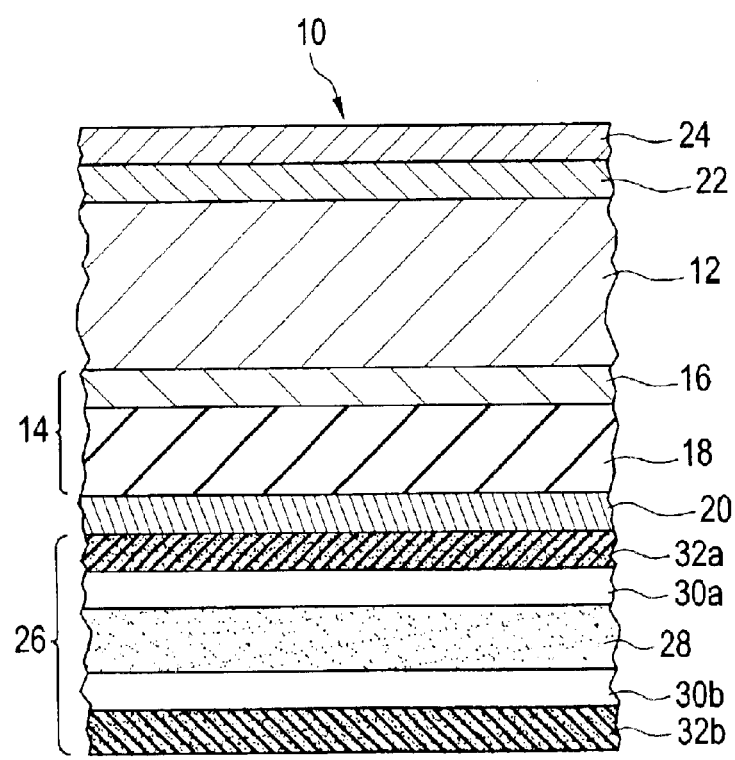
FIG. 2 is a cross-sectional view of another embodiment of the improved foam cushion tape including an intermediate layer 30 and a release coating 32 disposed on each side of the liner 28.
Figure 3:
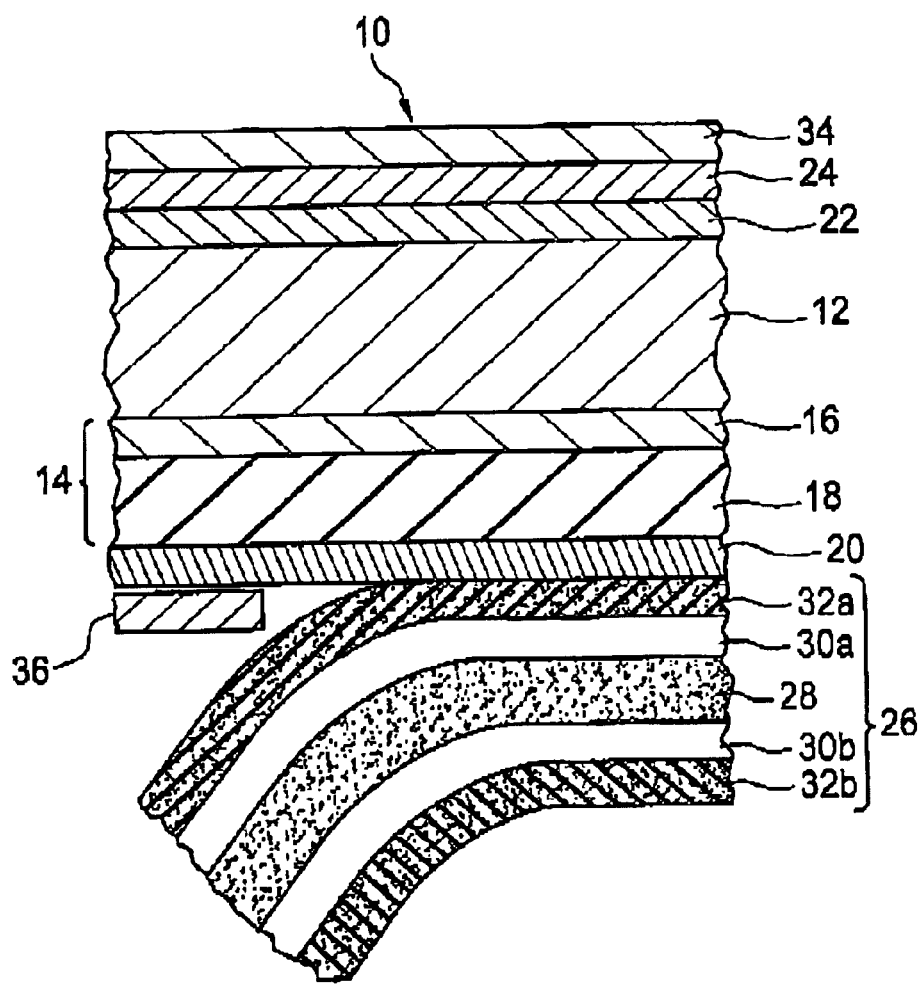
FIG. 3 is a cross-sectional view of the foam cushion tape adhering a flexible printing plate to a plate cylinder.

In an alternative embodiment, illustrated in FIG. 2, the release layer 26 comprises an intermediate coating and a release coating on both faces of the liner 28, i.e., a first intermediate coating 30a and a first release coating 32a on one aide of liner 28 and a second intermediate coating 30b and a second release coating 32b on the other side of liner 28. This enables so-called differential release, in which foam cushion tape 10 dispensed from a roll preferentially separates between the release coating 32b in contact with one layer of tape and the first adhesive layer 24 of the underlying layer of tape. FIG. 3 shows the foam cushion tape 10 of FIGS. 1 and 2 adhering the first adhesive layer 24 to a printing cylinder 34 and adhering the second adhesive layer 20 to a flexible printing plate 36.

Polyurethane foam compositions suitable for use in the manufacture of the tapes are known in the art, being described, for example, in U.S. Pat. Nos. 5,973,016 and 5,922,781 to St. Clair et al., and 5,733,945 to Simpson. In general, polyurethane foams are formed from compositions comprising an organic isocyanate component reactive with an active hydrogen-containing component, a surfactant, and a catalyst. One process for forming the foam comprises forming the above-described composition; substantially uniformly dispersing inert gas throughout the mixture by mechanical beating of the mixture to form a heat curable froth which is substantially structurally and chemically stable, but workable at ambient conditions; and curing the froth to form a cured foam. Alternatively, the foam may be formed by addition of chemical or physical blowing agents known in the art, such as water, organic compounds when decomposed to generate gas, or volatile organic materials such as chlorofluorocarbons.

The organic polyisocyanate components preferably are those having the general formula:

$$Q(NCO)_i$$

wherein i is an integer of two or more and Q is an organic radical having the valence of i. Q can be a substituted or unsubstituted hydrocarbon group (i.e., an alkylene or an arylene group). Q can be a group having the formula $Q^1$-Z-$Q^1$ wherein $Q^1$ is an alkylene or arylene group and Z is —O—, —O-$Q^1$-, —C(O)—, —S—, —S-$Q^1$-S—, or —$SO_2$—. Examples of such compounds include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, isopropylbenzene-alpha-4-diisocyanate, and polymeric isocyanates such as polymethylene polyphenylisocyanate.

Q can also represent a polyurethane radical having a valence of i in which case $Q(NCO)_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of from about 30 percent to about 200 percent stoichiometric excess, the stoichiometry being based upon equivalents of isocyanate group per equivalent of hydroxyl in the polyol.

The amount of polyisocyanate employed will vary slightly depending upon the nature of the polyurethane being prepared. In general, the total —NCO equivalent to total active hydrogen equivalent should be such as to provide a ratio of 0.8 to 1.2 equivalents of —NCO per equivalent of active hydrogen, e.g., hydroxyl hydrogen, of the active hydrogen reactant, and preferably a ratio of about 0.9 to 1.1 equivalents of —NCO per active hydrogen.

The active hydrogen-containing component includes polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pat. Nos. 2,911,390 and 2,902,473); polyalkylene ether glycols (U.S. Pat. No. 2,808,391; British Pat. No. 733,624); poly-alkylene ether glycols (U.S. Pat. No. 2,808,391; British Pat. No. 733,624); polyalkylenearylene ether glycols (U.S. Pat. No. 2,808,391); and polyalkylene ether triols (U.S. Pat. No. 2,866,774).

Especially preferred polyhydroxyl-containing materials are the polyether polyols obtained by the chemical addition of alkylene oxides, such as ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Propylene oxide and mixtures or propylene oxide with ethylene oxide are preferred. The polyols listed above can be used per se as the active hydrogen compound.

Additional active hydrogen-containing compounds are the polymers of cyclic esters. The preparation of cyclic ester polymers from at least one cyclic ester monomer is well documented in the patent literature as exemplified by U.S. Pat. Nos. 3,021,309 through 3,021,317; 3,169,945; and 2,962,524. Suitable cyclic ester monomers include but are not limited to delta-valerolactone; epsilon-caprolactone; zeta-enantholactone; the monoalkyl-valerolactones, e.g., the monomethyl-, monoethyl-, and monohexyl-valerolactones.

Cyclic ester/alkylene oxide copolymers can also be prepared by reacting a mixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. from about 0.3 to about 1.0), in the presence of an inert normally-liquid saturated aliphatic hydrocarbon vehicle such as heptane and phosphorus pentafluoride as the catalyst therefor, at an elevated temperature, e.g., about 80° C.

Other active hydrogen-containing materials are the polymer polyol compositions obtained by polymerizing ethylenically unsaturated monomers in a polyol as described in U.S. Pat No. 3,383,351, the disclosure of which is incorporated herein by reference. Suitable monomers for producing such compositions include acrylonitrile, vinyl chloride, styrene, butadiene, vinylidene chloride and other ethylenically unsaturated monomers as identified and described in the above-mentioned U.S. patent. Suitable polyols include those listed and described hereinabove and in the U.S. patent. The polymer polyol compositions can contain from 1 to about 70 weight percent (wt %), preferably about 5 to about 50 wt %, and most preferably about 10 to about 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates and azo compounds.

Preferably, the polyol component further comprises a mixture of a low molecular weight diol having a molecular weight below about 200 (as chain extenders and/or cross linking. The relative amounts of each polyol component affect the moduli of the final foam product. An increase in the amount of the very low molecular weight components (hard segment), for example, dipropylene glycol (DPG), 1,4-butanediol, and 2-methyl-1,3-propanediol (MPDiol), results in a foam having higher modulus. Increasing the relative amounts of the 250–750 molecular weight components also increases the modulus, although not to as great an extent.

The polyol or polyol mixture can have hydroxyl numbers that vary over a wide range. In general, the hydroxyl numbers of the polyols or mixtures thereof, including other cross-linking additives, if employed, can range from about 28 to about 1000, and higher, preferably from about 100 to about 800. The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives used in the invention. The exact polyol or polyols employed depends upon the desired foam characteristics. In particular, variation in the polyol component can yield a wide range of moduli and toughness. The molecular weight and the hydroxyl number of the individual components and the total formulation are each selected properly to result in either slow recovery or resilient flexible foams.

A wide variety of surfactants can be employed for purposes of stabilizing the froth, organosilicone surfactants being preferred. A preferred organosilicone surfactant is a copolymer consisting essentially of $SiO_2$ (silicate) units and $(CH_3)_3SiO_{0.5}$ (trimethylsiloxy) units in a molar ratio of silicate to trimethylsiloxy units of about 0.8:1 to about 2.2:1, preferably about 1:1 to about 2.0:1. Another preferred organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. Additionally, conventional organopolysiloxane-polyoxyalkylene block copolymers such as those described in U.S. Pat. Nos. 2,834,748, 2,846,458, 2,868,824, 2,917,480 and 3,057,901 can be employed. The amount of the organosilicone polymer employed as a foam stabilizer in this invention can vary over wide limits, e.g., from about 0.5 weight parts to 10 weight parts or greater, per hundred weight parts of the active hydrogen component. Preferably, the amount of organosilicone copolymer present in the foam formulations varies from about 1.0 weight parts to about 6.0 parts on the same basis.

Catalysts include various inorganic metal compounds and metal compounds that include certain organic groups. Metal acetylacetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine) diacetyl acetylacetonato nickel, and the like. Ferric acetylacetonate is particularly preferred, due to its relative stability, good catalytic activity and lack of toxicity. The metal acetylacetonate is most conveniently added by pre-dissolution in a suitable solvent such as dipropylene glycol or other hydroxyl containing compound which will then participate in the reaction and become part of the final product.

Added to the metal acetylacetonate is acetylacetone (2,4-pentanedione), as disclosed in commonly assigned U.S. Pat. No. 5,733,945 to Simpson, which is incorporated herein by reference. The acetylacetone provides heat latency, which allows time for the required mixing, casting and other procedures, and avoids deleterious premature curing during low temperature processing. In general, the ratio of metal acetylacetonate to acetylacetone is about 2:1 on a weight basis. The amount of catalyst present in the liquid phase is preferably in the range of 0.03 to 3.0 weight parts per hundred weight parts of the active hydrogen compound.

Other additives may be added to the polyurethane froth mixture in the manufacturing process. For example, conventionally used additives such as fillers (alumina trihydrate, silica, talc, molecular sieves such as 4A molecular sieves, calcium carbonate, clay, and the like), dyes, pigments (for example titanium dioxide and iron oxide) and the like can be used. Use of hindered amine light stabilizers further imparts UV resistance. Small amounts of an auxiliary blowing agent can be employed. For example, high boiling fluorocarbons, e.g., boiling above about 40° C. can be used. Specific fluorocarbons include for example 1,1,2-trichloro-1,2,2-trifluoroethane and isomers of tetrachlorodifluoroethane, tetrachloromonofluoroethane, and the like. Other auxiliary blowing agents, such as small amounts of water, although it is not necessary, can be employed for purposes of providing an added expansion during heat curing in those cases where such added expansion is desired.

Methods and formulations for the formation of polyurethane foams are disclosed, for example, in U.S. Pat. Nos. 5,973,016 and 5,922,781. The foams may be frothed using chemical blowing agents, but are preferably manufactured by mechanical frothing with an inert gas. The gas phase of the froths is most preferably air because of its cheapness and ready availability. However, if desired, other gases, for example, nitrogen, carbon dioxide, and fluorocarbons that are normally gaseous at ambient temperatures, and which are substantially inert or non-reactive with any component of the liquid phase can be used. The inert gas is incorporated into the liquid phase by mechanical beating of the liquid phase in high shear equipment such as in a Hobart mixer or an Oakes mixer. The mechanical beating operation preferably is conducted at pressures not greater than 100 to 200 p.s.i.g. Conventional, readily available, mixing equipment is used and no special equipment is necessary. The amount of inert gas beaten into the liquid phase should be adequate to provide a froth having a density at ambient atmospheric pressure of less than about 45%, preferably less than about 35%, of the density of the liquid phase prior to frothing. The mechanical beating is conducted over a period of a few seconds in an Oakes mixer, or of 3 to 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., about 10° C. to about 40° C.

After frothing, the froth mixture is transferred at a controlled rate through a hose or other conduit to be deposited onto the anchoring layer 16 of composite reinforcing film 14. The film is played out from a supply roll and is pulled by rolls to pass by various stations in the system, and, generally, is ultimately rewound on a take-up roll. As the film is moved with the foam material deposited thereon, the foam is spread to a layer of desired thickness by a doctoring blade or other suitable spreading device. A simple knife-over-table doctoring blade or other more complex spreading devices such as a knife-over-roller coaters or three- or four-roll reversible coaters may be employed. The doctoring blade spreads the foam material to the desired thickness.

The gauged layer of foam is then delivered to a heating zone for cure of the polyurethane foams, wherein the temperatures are maintained in a range from about 200° F. to about 450° F. (about to about ° C.) depending on the composition of the foam material. Differential temperatures can be established for purposes of forming an integral skin on one layer of the foam or for laminating a relatively heavy layer to the foam.

After the material is heated and cured, it is then passed to a cooling zone where it is cooled by any suitable cooling device such as fans. The final product is then taken up on a roll for storage and use as desired. The polyurethane foam product produced by the process described will be a composite foam sheet of uniform gauge. The gauge is easily controlled by the doctoring blade since there is no reactive expansion of foaming material during the curing process. The only expansion during the curing process is the heat induced expansion of the air bubbles in the foam mixture, the total amount of which can be easily calculated in advance to provide close control on the gauge of the finished product. The density of the finished product is also relatively uniform because the conduction and radiant heating during the curing process provides for relatively even heat distribution across the foam sheet.

In use, the thin, flexible foam cushion tape is adhered to a printing cylinder by first adhesive layer 24, and to a printing plate, e.g., a photopolymer printing plate by second adhesive layer 20.

The invention is further illustrated by the following non-limiting examples.

EXAMPLES

Example 1

To test adhesion of the foam to the reinforcing film, a polyurethane foam was cast onto a variety of reinforcing films (Table 1). Accordingly, all foam components (polyol, catalyst and additives except for surfactant, pigment, and isocyanate) were mixed and placed in a holding tank with agitation and under dry nitrogen. This mixture was then pumped at a controlled flow rate to a high shear mixing head of the Oakes type. The isocyanate, surfactant, and pigment mixture were also separately pumped into the mixing head at controlled flow rates and at the proper flow ratios relative to the polyols mixture flow rate. Flow meters were used to measure and adjust the flow rates of the various raw material streams. Dry air was introduced into the mix head using a gas flow rate controller to adjust the airflow rate such that cured material had a density of about 30 pounds per cubic foot (kilograms per cubic meter). After mixing and foaming in the high shear mixer, the materials were pumped through flexible hoses and out through rigid nozzles.

The polyurethane foam composition was then cast onto the films shown in Table 1 below. The film was drawn through the machine at about 30 feet per minute. A knife over plate (KOP) coater spread the foam and was used to control the thickness of the final product to about 0.016 inches (400 microns). The cast width of the foam layer was about 56 inches (142.2 centimeters).

The coated film was then passed through a curing section consisting of heated platens kept at 120° F. to 320° F. (49° to 160° C.) by a series of thermocouples, controllers, and heating elements. A series of upper platens were kept at 450° F. (232° C.). The cured product then passed through an air-cooling section, a series of drive rollers, and was wound up on a take-up roll.

Typical loss factors for the resilient foams are less than about 0.5 at or near room temperature. Loss factor was measured using a Rheometerics RDAII Dynamic Analyzer, Model RW 35076, using the Dynamic Temperature Ramp at a frequency of 100 radians per second at 0.3% strain. The test specimen consisted of one one-inch circle die-punched from a sheet of material. The sample was placed between 25 millimeter serrated parallel plates and compressed slightly. The gap dimension was recorded at 20% normal force as displayed by the instrument and maintained using the instrument's auto-tension feature. Test temperatures ranged from −40° C. to 210° C. using a 5° C. per minute temperature ramp.

Adhesion of the foams to PET was measured using a crosshatch and peel test. This test consists of scoring the foam with an "X" using a razor, and being careful not to cut through the PET film. The intersection of the X is then peeled with the thumb using a rolling action. Materials that will allow the foam to be peeled away intact fail, whereas the constructions that result in the foam tearing pass.

TABLE 1

| Trade Name | Manufacturer | Film Type; Treatment/Coating | Result |
|---|---|---|---|
| Comparative Examples | | | |
| Mylar A | DuPont | BOPET[1] film; No treatment | Failed |
| Mylar A | DuPont | BOPET[1] film; Corona treated | Failed |
| Mylar A | DuPont | BOPET[1] film, PCI PT03[2] treatment | Failed |
| Mylar D | DuPont | BOPET[1] film; No treatment | Failed |
| GAA | Pilcher Hamilton | BOPET[1] film; No treatment | Failed |
| 3 SAB | Pilcher Hamilton | BOPET[1] film; Coated to promote silicone adhesion | Failed |
| APP | CPF Films | BOPET[1] film; Coated with polyester primer | Failed |
| Marnot XL | Tekra | BOPET[1] film; Coated with hard acrylic | Failed |
| Marnot OL | Tekra | BOPET[1] film; Coated with hard acrylic | Failed |
| SA 2 | Teijen | Biaxially-oriented polyethylene terephthalate film having high z-axis strength; No treatment | Failed |
| Mellinex 453 | DuPont | BOPET[1] film; acrylic coating | Failed |
| Mellinex 316 | DuPont | BOPET[1] film; urethane coating | Failed |
| Inventive Examples | | | |
| Mellinex 301H | DuPont | BOPET[1] film; co-extruded with copolyester layer | Pass |
| Weld Seal-30 | Rockwell | BOPET[1] film; co-extruded with copolyester layer | Pass |
| 150M34 | DuPont | BOPET[1] film; PVDC primer; co-extruded with copolyester layer (heat sealable at 240° F.) | Pass |
| 200 XOL2 | DuPont | BOPET[1] film; PVDC primer; co-extruded with copolyester layer (heat sealable at 280° F.) | Pass |

[1]Biaxially oriented polyethylene terephthalate film
[2]Precision Coatings Inc. (Walled Lake, MI) Pretreat 03 acid etched film

Example 2

To test adhesion to different types of films, the above procedures were followed using the films set forth in Table 2 below.

TABLE 2

| Trade Name | Manufacturer | Description | Result |
|---|---|---|---|
| PVC Vinyl | Presco | Flexible vinyl | Passed |
| PVC Vinyl | Flexcon | Rigid vinyl | Passed |
| KALADEX* | DuPont | Polyethylene naphthalate | Failed |
| LEXAN FR 83 | General Electric | Polycarbonate | Passed |
| VALOX FR1 | General Electric | Polybutylene terephthalate | Passed |
| ULTEM 1000 | General Electric | Polyetherimide | Passed |

*Comparative Example

Example 3

A compressible flexographic mounting tape was prepared by casting a mechanically frothed, curable polyurethane foam composition prepared as described in Example 1 onto the copolyester side of a co-extruded PET/co-polyester film (Weld Seal 30, Rockwell), the PET side of the film being acid etched using trichloroacetic acid. Three cured polyurethane foams were prepared, each having a density of 30 pounds per cubic feet (kilograms per cubic meter), a CFD (Compressive Force Deflection) at 15% compressive strain 8, 18, or 30 pounds per square inch (+/2 psi), and a loss factor of 0.15.

The etched PET side was laminated to a removable acrylic pressure sensitive adhesive coated on the tighter release side of a high density polyethylene coated Kraft paper with a differential silicone release on both sides. The acrylic adhesive was 1.5–2.0 mils (37.5–50 micrometers) thick with a bond of 1.5–2.5 pounds per linear inch to the backside of a photopolymer printing plate when tested at 90° peel angle and 12 inches (30.5 centimeters) per minute peel rate after 24 hour dwell.

This construction was then coated with another removable pressure sensitive acrylic adhesive on the foam side, the adhesive being 1.5–2.0 mil (37.5–50 micrometers) thick with a 1–2 pound per linear inch bond to stainless steel when dwell tested at 90° peel angle and 12 inches (30.5 centimeters) per minute peel rate after 24 hour dwell. The overall thickness of the composite reinforcing film, foam, and adhesives was 0.022 inches (micrometers).

The double-side flexographic foam tape was mounted onto a steel cylinder of a flexographic printing press, using the adhesive on the foam side of the tape. A "fingerprint" flexographic photopolymer plate (0.067 inches (micrometers)) thick, Shore A durometer of 50) was affixed to the PET side adhesive after removal of the release liner. The image on the plate was ruled at 120 lines per inch and consisted of tone scales various size fonts and type and reverses, and slur targets. A water based magenta ink was applied to the plate using a 600 lpi anilox roll with a cell volume of 2.3 billion cubic micrometers). A corona treated, white polyethylene was used for the print trials, at a lines speed of 200 feet per minute. The press was adjusted to optimal impression using the slur targets to check for over-impression.

Print performance was evaluated using solid ink density (SID) and dot gain. The SID was determined by densitometer readings of printed solids. The dot gain was obtained from densitometer readings of the tone scales using the Marry-Davis formula. As may be seen by reference to Table 3 below, the tape provides a combination of high solid ink density and low dot gain. The tape was removed cleanly from the cylinder without tearing.

TABLE 3

| Actual | Compressive Force Deflection at 15%, psi | | |
|---|---|---|---|
| Dot Area | 8 | 18 | 30 |
| 2 | 10 | 17 | 22 |
| 3 | 14 | 19 | 26 |
| 4 | 17 | 22 | 28 |
| 5 | 21 | 25 | 32 |
| 10 | 33 | 37 | 44 |
| 20 | 46 | 58 | 64 |
| 30 | 60 | 71 | 75 |
| 40 | 72 | 84 | 84 |
| 50 | 83 | 95 | 92 |
| 60 | 91 | 99 | 100 |
| 70 | 96 | 100 | 100 |
| 80 | 100 | 100 | 100 |
| 90 | 100 | 100 | 100 |
| Solid Ink Density | 1.07 | 1.36 | 1.49 |

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for flexographic printing comprising:
providing a foam cushion tape, wherein the foam cushion tape comprises:
a compressible polyurethane foam layer having a first side and an opposite second side;
a composite reinforcing film comprising an anchoring layer and a reinforcing layer, wherein the second side of the polyurethane foam layer is disposed on the anchoring layer of the composite reinforcing film;
a first adhesive disposed on the first side of the compressible polyurethane foam layer; and
a second adhesive disposed on the reinforcing layer of the composite reinforcing film; and
adhering the first adhesive layer to a printing cylinder, and adhering the second adhesive layer to a flexible printing plate.

2. The method of claim 1, wherein the compressible polyurethane foam layer has a thickness of about 5 to about 60 mils (about 25 to about 1500 micrometers).

3. The method of claim 1, wherein the compressible polyurethane foam layer has a thickness of about 12 to about 17 mils (about 300 to about 425 micrometers).

4. The method of claim 1, wherein the anchoring layer is selected from the group consisting of polyvinylidene chloride, polyurethane, copolyoster, and nylon, and the reinforcing layer is selected from the group consisting of polyethylene terephthalate, polybutylene terephthalate, polyvinyl, polycarbonate, and polyetherimide.

5. The method of claim 1, wherein the anchoring layer comprises polyvinylidene chloride and the reinforcing layer comprises polyethylene terephthalate.

6. The method of claim 1, wherein the compressible polyurethane foam layer is open-celled.

7. The method of claim 1, further comprising a co-extruded anchoring layer and reinforcing layer.

8. The method of claim 1, wherein the reinforcing layer is acid etched.

9. A method for flexographic printing comprising:
providing a foam cushion tape, wherein the foam cushion tape comprises:
a compressible, open-celled polyurethane foam layer having a first side and an opposite second side, wherein the compressible polyurethane foam has a thickness of about 5 to about 60 mile (about 125 to about 1500 micrometers);
a composite reinforcing film comprising:
an anchoring layer selected from the group consisting of polyurethane, nylon, copolyoster, and polyvinylidene chloride; and
a reinforcing layer selected from the group consisting of polyethylene terephthalate, polybutylene terephthalate, polyvinyl, polycarbonate, and polyetherimide;
wherein the second side of the polyurethane foam layer is disposed on the anchoring layer of the composite reinforcing film;
a first pressure sensitive adhesive layer disposed on the first side of the compressible polyurethane foam layer;
a second pressure sensitive adhesive layer disposed on the reinforcing layer of the composite reinforcing film; and
a release layer disposed on a side of the second adhesive layer opposite to the reinforcing layer, wherein the release layer comprises:
a release coating disposed on the second adhesive layer on a side opposite to the reinforcing layer;

an intermediate layer disposed on the release coating on a side opposite to the second adhesive layer; and a liner disposed on the intermediate layer on a side opposite to the release coating;

adhering the first pressure sensitive adhesive layer to a printing cylinder; and adhering the second pressure sensitive adhesive layer to a flexible printing plate.

10. The method of claim 9, wherein the anchoring layer comprises polyvinylidene chloride and the reinforcing layer comprises polyethylene terephthalate.

11. The method of claim 9, wherein the compressible polyurethane foam layer is open-celled.

12. The method of claim 9, further comprising a co-extruded anchoring layer and reinforcing layer.

13. The method of claim 9, wherein the reinforcing layer is acid etched.

14. A method for flexographic printing comprising:

providing a foam cushion tape comprising:
- a compressible, open-celled polyurethane foam layer having a first side and an opposite second side, wherein the compressible polyurethane foam has a thickness of about 5 to about 60 mils;
- a composite reinforcing film comprising a polyvinylidene chloride anchoring layer and a polyethylene terephthalate reinforcing layer, wherein the second side of the polyurethane foam layer is disposed on the anchoring layer of the composite reinforcing film;
- a first pressure sensitive adhesive layer disposed on the first side of the compressible polyurethane foam layer;
- a second pressure sensitive adhesive layer disposed on the reinforcing layer of the composite reinforcing film; and
- a release layer disposed on a side of the second adhesive layer opposite to the reinforcing layer, wherein the release layer comprises:
  - a release coating disposed on the second adhesive layer on a side opposite to the reinforcing layer;
  - an intermediate layer disposed on the release coating on a side opposite to the second adhesive layer; and
  - a liner disposed on the intermediate layer on a side opposite to the release coating;
- a second intermediate layer disposed on the liner on a side opposite to the intermediate layer; and
- a second release coating disposed on the second intermediate layer on a side opposite to the liner;

adhering the first pressure sensitive adhesive layer to a printing cylinder; and adhering the second pressure sensitive adhesive layer to a flexible printing plate.

15. The method of claim 14, wherein the compressible polyurethane foam layer has a thickness of about 12 to about 17 mils (about 300 to about 425 micrometers).

* * * * *

UNITED STATES PATENT AND TRADEMARK OFFICE
CERTIFICATE OF CORRECTION

PATENT NO. : 6,915,741 B2 Page 1 of 1
APPLICATION NO. : 10/318209
DATED : July 12, 2005
INVENTOR(S) : Bruce E. Price et al.

It is certified that error appears in the above-identified patent and that said Letters Patent is hereby corrected as shown below:

Title Page,
Item (57) Abstract,
Line 4, after "second", delete "aide" and insert therefor --side--.
Line 8, after "disposed" delete "an" and insert therefor --on--.
Line 10, before "polymer", delete "olefinio" and insert therefor --olefinic--.

Column 12,
Line 25, after "polyurethane," delete "copolyoster" and insert therefor --copolyester--.
Line 44, after "60", delete "mile" and insert therefor --mils--.
Line 48, after "nylon,", delete "copolyoster" and insert therefor --copolyester--.

Signed and Sealed this

Twenty-sixth Day of December, 2006

JON W. DUDAS
*Director of the United States Patent and Trademark Office*